Aug. 8, 1967 T. F. PETERSON 3,334,663
METHOD AND ARTICLES FOR SPLICING PLASTIC PIPE
Filed April 6, 1964 2 Sheets-Sheet 2

United States Patent Office 3,334,663
Patented Aug. 8, 1967

3,334,663
METHOD AND ARTICLES FOR SPLICING PLASTIC PIPE
Thomas F. Peterson, deceased, late of Shaker Heights, Ohio, by John D. Drinko, Lyndhurst, Ohio (1956 Union Commerce Bldg., Cleveland, Ohio 44114), and Central National Bank of Cleveland, 123 Prospect Ave. SW., Cleveland, Ohio 44101, coexecutors
Filed Apr. 6, 1964, Ser. No. 358,395
15 Claims. (Cl. 138—132)

The present invention relates to methods and articles useful, for example, for splicing lengths of plastic pipe and tubing as currently used for carrying fluids, for example in highly corrosive soils or atmospheres or when the fluids carried would seriously corrode more conventional metal pipe or rubber hose.

In connection with such plastic pipe there has been a considerable problem as regards the fittings required to join length ends. If the fittings are to be of metal, then they will corrode and be a weakest link, and whether the fittings are metal or plastic there is still the desire to avoid screw threads which require lengthwise movement of the pipe lengths before and during tightening and which dictate that either fixed lengths of pipe must be used or the lengths themselves must be threaded in the field.

An object of the present invention is to provide simple means for overcoming the above mentioned difficulties.

Another object of the invention is to provide methods and articles which overcome present plastic pipe end fitting defects as regards first cost, installation cost, efficacy of sealing and resistance to corrosion.

Another object of the invention is to provide methods and articles which permit splices to be made from the side of the plastic pipe whereby individual sections being joined need not be turned circumferentially with respect to one another or moved lengthwise with respect to one another after they are first arranged in a preferred perhaps abutting relationship.

Other objects and advantages will become apparent and the invention may be better understood from consideration of the following description taken in connection with the accompanying drawings in which the figures show various steps or alternatives which may be performed following methods and developing articles according to the present invention, and where FIG. 1 is a schematic elevation view showing the making of a tube about a mandrel;

In accordance with one aspect, the present invention provides a manufacturable, and individually salable, helically preformed plastic, plural-metal-element-reinforced, splice member for splicing end-for-end aligned lengths of plastic pipe, or for splicing other elongated elements. While there is illustrated and described a splice using a plurality of two such members (each extending arcuately about 180° in transverse section, as in FIGS. 7 and 10 of the drawings), a finished splice could utilize a different number of members made according to the invention. Thus the splice might have three such members, each extending about 120° (if projected onto a transverse section), or it might have only one, extending, for example, 270° in transverse section. If there is more than one (to provide an ultimate 360° or "full" lay on the final splice), they may be assembled as a full set by manufacturer or dealer and then taken apart and immediately twisted together again at the point of use (for splicing). In any event, each splicing member forms a more or less tubular envelope; it was helically preformed (before application to the splice) and thus (e.g., as sold) it *is* helically preformed, it has an inner diameter (of preform) preferably less than the pipe being spliced, it has a long pitch with consequent longitudinal strength and an opening between turns sufficient to permit of application to the pipe being spliced from the side. Each such member may be thought of as arcuate in transverse cross section and it comprises plural relatively less flexible (e.g., metallic) helically preformed reinforcements and relatively more flexible plastic. In a preferred embodiment the plastic extends between the reinforcements (for holding the mass together), within the reinforcements (for sealing and to avoid corrosion or electrolysis), and around or radially outside the reinforcements (to prevent corrosion and provide other advantages).

The so-called "less flexible" preformed reinforcements with which the present invention is concerned are similar to those set forth in prior U.S. patents such as 2,609,653 and 2,736,398—Peterson.

Figure 1:
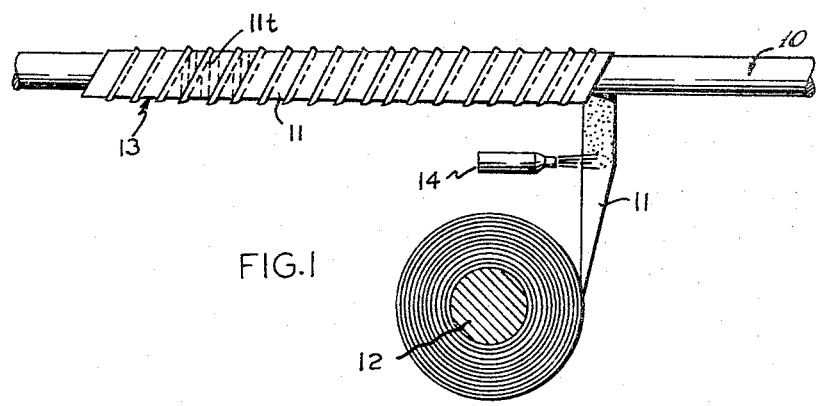

Referring now to FIG. 1, as a possible first step a mandrel 10 (which could be a collapsible tube, although this is not shown) is wrapped with a plastic tape 11 supplied from a feed roll 12. This plastic may be a fiberglass thread reinforced tape with fiberglass reinforcements 11t, preferably running in circumferential direction in final position which is after the wrapping about the mandrel to form a plastic "core" 13. If desired, an abrasive grit may be sprayed from a gun 14 to ultimately lie on the inside of the wrap and increase the frictional resistance of the splice ultimately developed according to the present invention.

Figure 2:
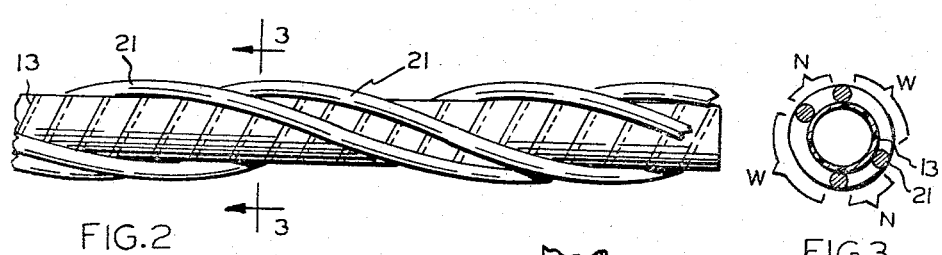
FIG. 2 is a corresponding view of the tube made according to FIG. 1 with helically preformed reinforcements applied thereto.

As a next step, and as shown in FIG. 2, and either before or after the core 13 has been removed from the mandrel 10 of FIG. 1, the core predominantly of plastic (e.g., a resin type fiberglass reinforced) which is somewhat flexible is covered with less flexible helically preformed reinforcements 21 of a material (e.g., a metal or a so-called rigid polyvinyl chloride) having sufficient stiffness and rigidity to be used for the purpose intended and yet which have sufficient resiliency in light of their open pitch (and long pitch as hereafter defined) to allow the ultimate preformed combination (as hereafter explained) to be applied around plastic pipe or tubing from the side thereof without exceeding the elastic limit of the reinforcements. If the reinforcements 21 are metal, aluminum is a preferred material. In any event they are circumferentially, and thus also axially, spaced from one another about the hollow tube 13.

Figure 3:
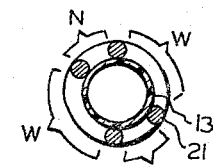
FIG. 3 is a cross section taken on line 3—3 of FIG. 2.

As shown in FIG. 3 this spacing at each of two spaces N is a narrow space about the width of one reinforcement while at 90 degrees therefrom there are two diametrically opposite wider spaces W and in which slits are later made as later described.

Figure 4:
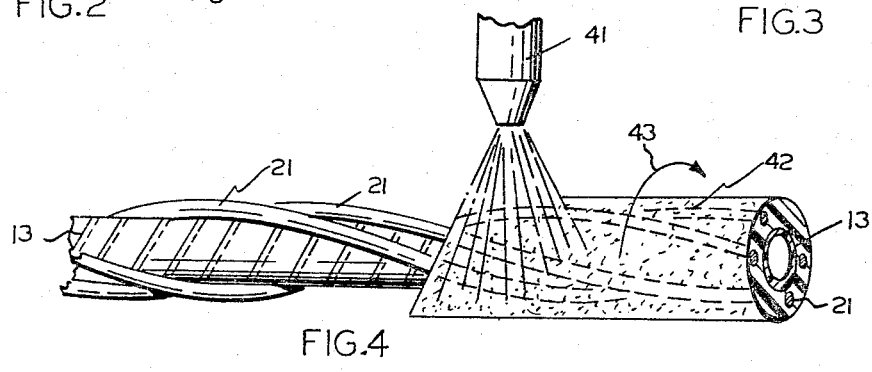
FIG. 4 shows application of plastic to the preforms of FIGS. 2 and 3 by a spraying process.

As a next step the reinforcements 21 are covered with plastic material extending between as well as radially outside of themselves (while plastic also extends radially inward according to the prior fashioning of the core 13). This step is suggested in FIG. 4 where a plastic spray from a head 41 is shown forming a covering 42 between and about the reinforcements 21 as they and the tube 13 are rotated and axially advanced with respect to the spray as diagrammatically illustrated by the arrow 43.

Figure 5:
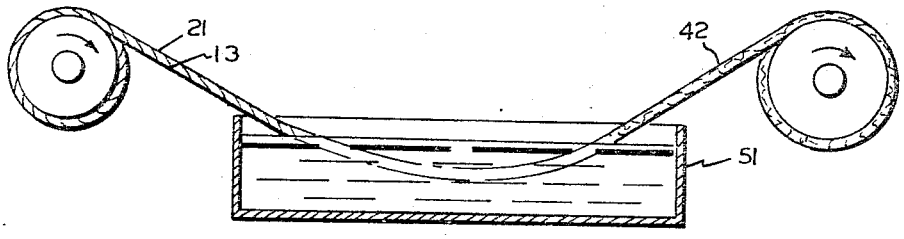
FIG. 5 shows a modification in which plastic is applied by dipping.

Alternatively, the plastic between and outside the reinforcements could be applied by dipping as in a tank 51 (see FIG. 5), or as another alternative a whole tube of more flexible inner plastic, outer plastic and in-between plastic and less flexible (for example, metal) helically preformed reinforcements 21 could be made by one extrusion step as illustrated and described in copending Thomas F. Peterson patent application Ser. No. 212,006, filed July 24, 1962, now Patent 3,172,931.

Figure 6:
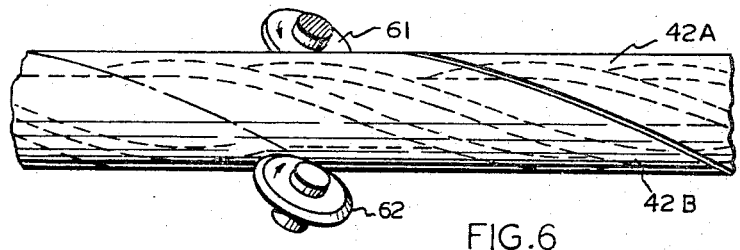
FIG. 6 shows a slitting step which provides helically preformed combinations each having less flexible helically preformed reinforcements and more flexible plastic covering between, radially inside and radially outside of the reinforcements.

As a next step and as illustrated by FIG. 6 the tube of plastic sheathed reinforcements is slit helically through the plastic (and between the reinforcements) as in a machine having slitting disks shown only symbolically at 61 and 62. Whether the slitting provides two helically preformed combinations 42A, 42B (as shown in FIG. 6) or more is not particularly important but it is preferred that each such helically preformed combination have at least two of the helically preformed reinforcements of less flexible material within the more flexible plastic, and be sooner or later cut into individual "splice lengths."

Figure 7:
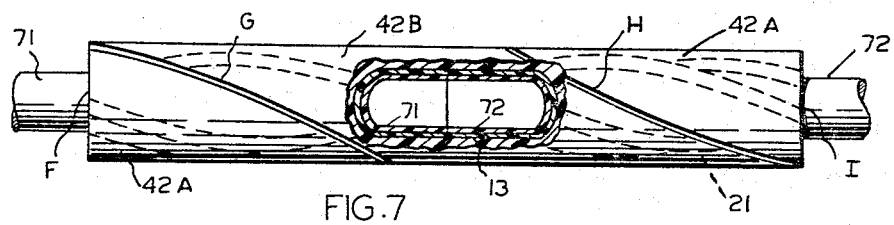
FIG. 7 shows application of the helically preformed combinations of FIG. 6 to securely splice end-for-end arranged pieces of plastic pipe.

As a next step (see FIG. 7) the two things to be joined, such as two extended lengths of plastic pipe, 71, 72 are abutted in coaxial relation and the preformed helical combinations (each comprising more flexible plastic covering over less flexible helically preformed reinforcements and each having a long pitch, e.g., of more than twice the diameter of the helix, and an opening between turns sufficient to permit of applicataion of the combination from the side, and each such combination preferably having an I.D. equal to or less than the O.D. of the pipe members to be spliced) are twisted around the members to be spliced as shown in FIG. 7 with its cut-away "window" portion. It should be noted that this is not a simple wrapping operation because the members 42 are helically preformed and they must, then, be temporarily deformed as they are individually twisted into place in contiguous abutting relation one with the other.

As a final step, all of the plastic to plastic exposed junctions, for example as seen at F, G, H and I in FIG. 7, may be cemented, bonded, flame welded, or otherwise joined together to provide a fluid tight seal.

Figure 8:
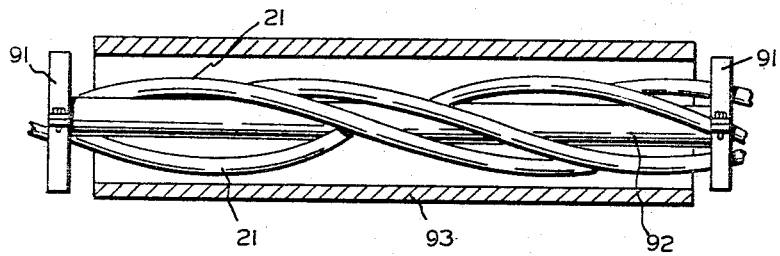
FIGS. 8 and 9 show an alternative pattern and mold arrangement suitable for ultimately fashioning a helically preformed combination having less flexible helically preformed reinforcements with more flexible plastic between, within and outside of the reinforcements.
Figures 9, 10:
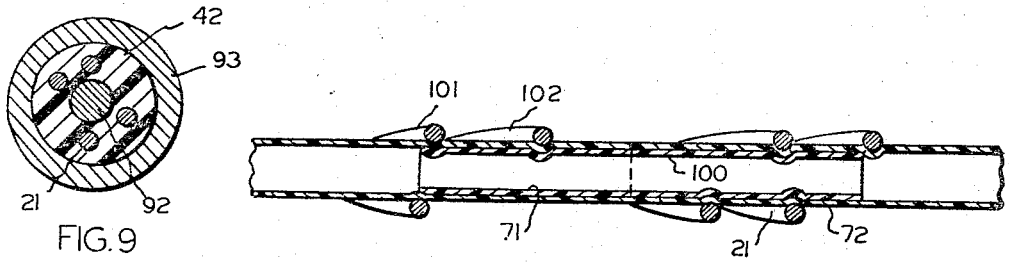
FIG. 10 shows a modified pipe splice.

Another manner of making up combinations each comprising a more flexible plastic cover around plural less flexible helically preformed reinforcements is shown in FIGS. 8 and 9. As seen in FIG. 8, end clamps 91 hold the spaced helically preformed reinforcements 21 about midway between an inner pattern 92 and an outer mold 93. Thereupon, a plastic 42 is poured or otherwise caused, e.g., by compression molding, to enter the spaces between the reinforcements and between the pattern and the mold and allowed to "cure" as shown in FIG. 9. While the about to be described arrangement is too complex to try to show in a view like FIG. 8, it would be possible to have a split mold forming a closure with a "half" pattern with one or both provided with major helical grooving so that a single preformed helical combination could be individually molded without the necessity of later resorting to the slitting step of FIG. 6.

Other arrangements might be used, and FIG. 10 is a sectional view showing a modification where a pipe joint or splice comprises an inner plastic tube 100 into which the end portions of pipe lengths (71, 72) being spliced are deformed by outer preformed helical reinforcements 101, 102, etc., each of which may be a plastic covered metal reinforcement, or which might even be bare metal if the ambient (air, soil, or whatever) is non-corrosive.

Figure 11:
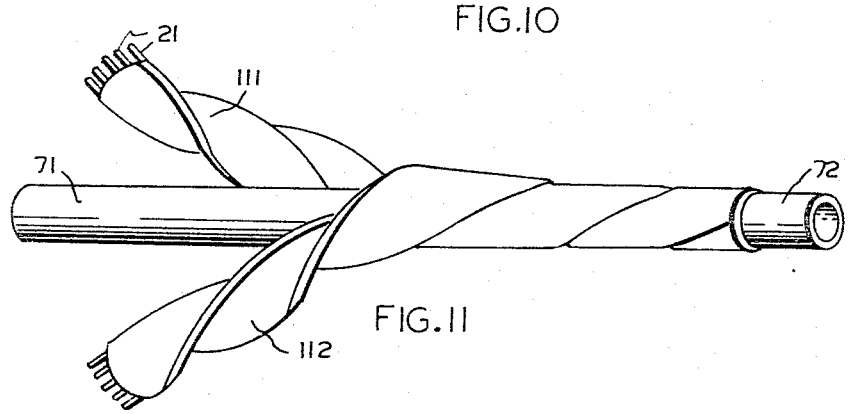
FIG. 11 shows another modification.

Another arrangement is shown in FIG. 11. Here the individual metallic reinforcements 21 may be assumed either originally held spaced apart and then dipped in a plastic or neoprene, e.g., by groups of five, or each originally individually covered with a plastic coating and then (e.g., in groups of five) assembled in half sets to form the two helically preformed metal reinforced plastic coated combinations 111 and 112 (totaling ten coated strands) which are then applied to make a full set to complete the splice of pipe sections 71 and 72.

For any of the arrangements shown, and in the claims hereafter, the word "plastic" (as used for the "more flexible" material) is intended to cover any resinous thermoplastic material (e.g., a plastisol, a polyvinyl chloride dispersion being suitable) as well as elastomeric compounds (rubber, neoprene, etc.) just so long as it is flexible enough to apply (thus being more flexible than the reinforcements which are applicable only because of their smaller cross section dimension). Preferably the resinous thermoplastics or the elastomers are capable of later being sealed (e.g., by a compatible cement, or in some cases by flame welding), to secure the combinations to each other and to the pipe being spliced. Often, it may be desirable to have the plastic of the covering, i.e., of the more flexible portion of the splice, be substantially identical to the plastic of the pipe sections being joined for there is then the greatest assurance of compatibility particularly during bonding for sealing.

Preferably the inside diameter of the "splice stock" (that is each helically preformed combination including more flexible plastic within and/or without the less flexible helically preformed reinforcements) has an inner diameter slightly less than the outer diameter of the pipe being spliced because this affords the best gripping action and as a matter of fact, this provision can assure that the splice will be stronger than the unspliced portions of the pipe itself.

As already intimated, the pitch length of the less flexible helically preformed reinforcements is sufficiently great (e.g., like that of the final "splice stock" being on the order of more than twice the, or any, diameter of the helix) to permit application of the final preformed combinations from the side of the pipe being spliced by deforming the helically preformed combinations well within the elastic limit of both the more flexible plastic covering and the less flexible helical reinforcements. This provides pronounced advantages in the field for it is not necessary to apply a pipe wrench to, or stress threads of, anything, it is not necessary to change the relative lengthwise or diametrical position of abutted pipes as has so often heretofore been found disadvantageous when threading into unions, yet all the while in the final splice the less flexible helically performed reinforcement press inwardly (though through plastic) upon the inner pipe providing long points of anchorage, which can be further enhanced if abrasive material is used inside of the plastic of the splice as suggested in FIG. 1.

But whether or not such abrasive material is used the preformed set in the less flexible helically preformed reinforcements can make the plastic of the splice tightly adhere to the plastic of the pipe spliced, without the need of extraneous ties, clamps, or fittings, so that axial displacement of the spliced members is strongly resisted without depending upon the plastic bond which is used only for making fluid tight.

There is thus provided methods and articles of the class described capable of meeting the objects above set forth, eliminating the use of screw threads or other wrench tightened means for joining plastic pipe and providing economical constructions with relatively huge areas of contact in a longitudinal direction for providing a splice structure stronger than the pipe itself wherever flexible irrigation pipe, flexible pressure tubing, and the like need to be brought together and fastened.

As used in the claims hereinafter, the words "transversely" and "in right cross section" are used to refer to an assumed plane normal to the longitudinal extent of a splice member (i.e., normal to the axis of its helical preform). A "helix diameter" may be considered as an inner, or average, or outer diameter of a helical configuration projected, if need be, so that the dimension can be read in a single plane of right cross section. A "sleeve" might be either a cylinder (e.g., a full lay of two 180° transversely arcuate members), or it might be a part cylinder (e.g., a half lay of only 180°, in right cross section at any one point but effective, nevertheless, and by itself, as an integral splicing unit as it continues, for example through 360° helically, along the direction of the principal axis). Thus the term "circumferentially" as used in the claims may be taken to mean either "fully circumferentially," as well as "fully circumferentially but not necessarily in right section," or "part circumferentially in right section for some, part lay, cases." The term "parallel" as used in the claims means "keeping at the same distance, any one from an adjacent other." The term "from the side" means "other than from an end" (that is, other than the way pipe couplings are usually applied), and may have an even broader connotation for, with sufficient clearances provided, elements of the invention, because of their stiffness, can be applied from "one side" thus being unlike ordinary string which has to be wound about an object from many sides.

Many modifications are possible and if elongated elements being spliced are not cylindrical (like ordinary pipe) but instead have outer dimensions which are square or rectangular in transverse section, than the splice element or elements, according to the present invention, preferably has an inner (helix) diameter less than the diameter of a circle circumscribing the cross sectional area of each spliced element (as would be the case for splicing cylindrical pipe also).

It is not intended to limit the present invention to processes and articles for splicing "plastic pipe" for it also has applicability in other fields. It is not intended to limit the present invention to the precise constructions and methods shown for an expression such as "more flexible plastic extending around," or about, or with, "less flexible helical reinforcements" would obviously also cover the case where the less flexible reinforcements are a full set, i.e., by their own adjacency forming one covering through 360°, while more flexible helically preformed "plastic" elements span and overlap the joints of the first set and, being softer, seal the same, for, while particular embodiments have been illustrated and described, various modifications may obviously be made without departing from the true spirit and scope of the invention which is intended to be defined only by the accompanying claims taken with all reasonable equivalents, so far as the prior art permits.

What is claimed is:

1. As an article of manufacture, a splice member for plastic pipe used for conveying fluids under pressure, said splice member comprising a longitudinally extending, transversely arcuate, helically preformed combination of plural helically preformed metallic reinforcements and a relatively more flexible plastic extending arcuately between, radially within, and radially outside said reinforcements.

2. An article of manufacture as in claim 1, further characterized by said article being a combination which is preformed to present in right cross section an inner radius corresponding to a diameter less than the outer diameter of pipe for which said article is nominally designated as a splice.

3. An article of manufacture as in claim 1, further characterized by the preformed metallic reinforcements and the preformed combination all having a pitch length greater than several times any of their helix diameters and an opening between turns and sufficient resilience to permit of application of the splice member from the side of the pipe without exceeding the elastic limit of the reinforcements or of the plastic of the preformed combination.

4. As a new article of manufacture useful for splicing more or less abutted elongated elements which are circular in cross section,
   a sleeve which is a helically preformed combination comprising at least one integral open pitch helical splice member for circumferentially surrounding end portions of said elongated elements,
   said splice member having a pitch and opening between turns whereby to permit of application to the elongated elements from the side without disturbing their more or less abutted relationship,
   said splice member comprising (a) a part lay of plural predeterminedly spaced, substantially parallel, helically preformed reinforcements, and (b) an integrating plastic material which is more flexible than, and which extends around, in between, and inside of said reinforcements and holds the latter in the spaced relationship, the splice member components having sufficient stiffness, rigidity and resilience, and there being a sufficiently open pitch of both reinforcements and splice member, to permit of application to such more or less abutted elongated elements from the side without exceeding the elastic limit of the material of which said reinforcements and plastic are made.

5. A sleeve comprising a helical splice member as in claim 4 further characterized by the helical splice member having an initial, preformed, natural inner diameter which is less than the outer diameter of the elongated elements with which it is useful for splicing.

6. As a new article of manufacture for splicing elongated elements,
   a tubular structure of plural helically preformed combinations having a common inner diameter and adapted to be twisted together to form a whole lay envelope,
   each of said helically preformed combinations having a helical configuration and an inner diameter less than the diameter of a circle circumscribing the cross sectional area of said elements for splicingly surrounding substantially abutting end portions of said elements while extending along said end portions for a substantial distance in tightly gripping relation,
   each of said helically preformed combinations comprising (a) predeterminedly spaced substantially parallel helically preformed reinforcements, and (b) a plastic material more flexible than and extending around, in between and inside of the said reinforcements and holding said reinforcements in said spaced relation,
   each of said helically preformed combinations being in the form of a helix having a pitch on the order of at least several times the diameter of the helix, the more flexible plastic composition protecting the splice and protecting the less flexible reinforcements while said reinforcements impart longitudinal and radial reinforcement to the structure.

7. As a new article of manufacture useful for making splices from the side on and about end-for-end more or less abutted length ends of elements which are circular in cross section, the combination of:
   a tubular envelope of plural helically preformed combinations each of a helical configuration having an inner diameter of a size less than the outer diameter of the length ends to be spliced from the side whereby the ends to be spliced need not be disturbed from their end-for-end position,
   each of said helically preformed combinations being an elongated part-tube which is arcuate in transverse cross section and which comprises (a) plural relatively less flexible reinforcements, and (b) relatively more flexible integrating plastic extending around, in between and inside of the less flexible reinforcements which are of a material having sufficient stiffness and rigidity to be used for the purposes intended together with sufficient resiliency in light of the open pitch of their form and the open pitch of the individual helically preformed combinations to allow both to be applied around the plastic pipe or tubing being spliced from the side without exceeding the elastic limit of said reinforcements and their more flexible plastic covering.

8. Method of making a splice of two axially elongated articles, such as lengths of plastic pipe, which method comprises the steps of:

fixing a plurality of helically preformed form maintaining resilient material elements with spaces therebetween to form a skeleton tubular assembly with openings at least between the elements, each of said elements having been previously preformed in a helix having a pitch on the order of more than twice the diameter of the helix, in whatever order of steps providing a more flexible (than the material of said elements) plastic material within said skeleton assembly down to an inner diameter slightly less than the transverse to axis dimension of the elongated articles to be spliced, between said preformed elements of said assembly and radially outside of said elements, while assuring that the total assembly is not during at least one intermediate step fully tubular but comprises two or more helical combinations each having the less flexible helically preformed elements completely covered with more flexible plastic, and applying the intermediate step helical combinations one at a time to the two elongated articles to splice the same.

9. Method of splicing plastic pipe sections, and the like, which method comprises the steps of:

preforming each of a plurality of form-maintaining elements into a helix having a pitch of the order of more than twice the inner diameter of the helix and an inner diameter greater than the outer diameter of the sections to be spliced, fixing said elements with spaces axially and radially in between to form a skeleton assembly, providing a flexible plastic composition extending between said elements, radially outside said elements, and radially inward of said elements to an inner tubular or helical diameter not greater than the transverse to axis dimension of the sections as they are to be arranged to be spliced, applying the helically preformed form-maintaining elements embedded in plastic to the sections to be spliced, and bonding plastic to plastic exposed junctions to provide a fluid tight splice which is mechanically strengthened by the form-maintaining elements.

10. Method of making a splice for encompassing two axially elongated article portions, such as portions of tubular pipe, which method comprises the steps of:

preforming each of a plurality of form-maintaining metallic elements into a helix having a pitch of the order of more than twice the diameter of the helix, fixing said elements with spaces therebetween to form a skeleton tubular assembly, surrounding said elements with a non-metallic flexible plastic composition extending between said elements, radially outside said elements and, in whatever order of sequence of steps, within said elements radially to an inner diameter no greater than the transverse to axis dimension of the article portions as they are to be arranged to be spliced, slitting the plastic covered skeleton structure helically along lines through the plastic and between the metallic elements, to form plural metal reinforced plastic coated helical combinations each having a pitch and a diameter and an opening between turns such as to permit from the side easy application to, and strong seizure of, the article portions to be spliced, and applying the plural helical elements produced by said slitting to the two article portions to splice the same.

11. The method of claim 8 further characterized by:

the step of applying a friction improving agent to be at least on the inner diameter surface of the plastic which later becomes a metal reinforced helical member available for making the splice.

12. The method of claim 10 further characterized by a final step of:

bonding the plural helical elements formed by the slitting step and later reassembled as a splice each with every one in successive adjacency, and to the pipe sections being spliced.

13. Method of splicing two generally coaxial plastic pipe length ends which method comprises the steps of:

applying helically preformed metallic elements around said length ends to mechanically join the same, applying helically preformed plastic elements around said metallic elements to protect the metallic elements and to aid in fluid tight sealing the resultant splice.

14. An integral splicing unit for splicing linear bodies comprising, in combination:

a group of helically preformed reinforcing elements of mutually conforming open pitch and hand of lay intertwisted together in a parallel spaced relation to each other and forming a part tubular structure, said reinforcements being spaced apart a distance approximately equal to the width of one of the said reinforcements, a part lay tubular layer of plastic material more flexible than and extending around, in between, and inside of the said reinforcements and holding said reinforcements in spaced relation, said more flexible material having an internal diameter less than the outer diameter of said linear bodies, and said unit being adapted for tightly gripping application from the side of said bodies within the elastic limit of the materials of the said unit, and adapted for disassembly from and tightly gripping reassembly with the bodies to be spliced.

15. As a new article of manufacture for splicing elongated elements without the use of extraneous ties, a tubular splice composed of helically preformed part lay combinations having a common helical diameter twisted together with each other into a whole lay tubular envelope, each of said part lay combinations having a helical configuration and an inner diameter less than the diameter of a circle circumscribing the cross sectional area of said elements, said combinations together forming a whole lay splicingly surrounding substantially abutting end portions of said elements while extending along said end portions for a substantial distance in tightly gripping relation, each of said helically preformed part lay combinations being form maintaining and comprising (a) spaced apart substantially parallel plural helically preformed form maintaining reinforcements, and (b) a plastic material more flexible than and extending around, in between, and inside of the said reinforcements and holding said reinforcements in said spaced relation, said more flexible material further extending on each side of the said plural spaced reinforcements a distance greater than the width of one of the said reinforcements, said helically preformed combinations having a pitch length on the order of at least several times the helical diameter thereof and a limited body length equal to at least one such pitch to permit application of the combinations to the said elements from a side thereof without exceeding the elastic limit of said reinforcements and their more flexible plastic covering.

References Cited

UNITED STATES PATENTS

| | | | |
|---|---|---|---|
| 1,435,311 | 11/1922 | Knight | 138—110 |
| 1,601,092 | 9/1926 | Weigel | 138—133 |
| 2,032,753 | 3/1936 | James | 138—110 X |
| 2,266,214 | 12/1941 | Kellems | 24—123 |
| 2,609,653 | 9/1952 | Peterson | 57—145 |
| 2,930,406 | 3/1960 | Galloway | 285—293 X |
| 3,032,964 | 5/1962 | Peterson | 60—16 |

FOREIGN PATENTS 232,105  4/1925  Great Britain.

LAVERNE D. GEIGER, *Primary Examiner.*

C. L. HOUCK, *Assistant Examiner.*